R. A. ROWLEY.
TRUCK.
APPLICATION FILED FEB. 6, 1909.
925,388.
Patented June 15, 1909.
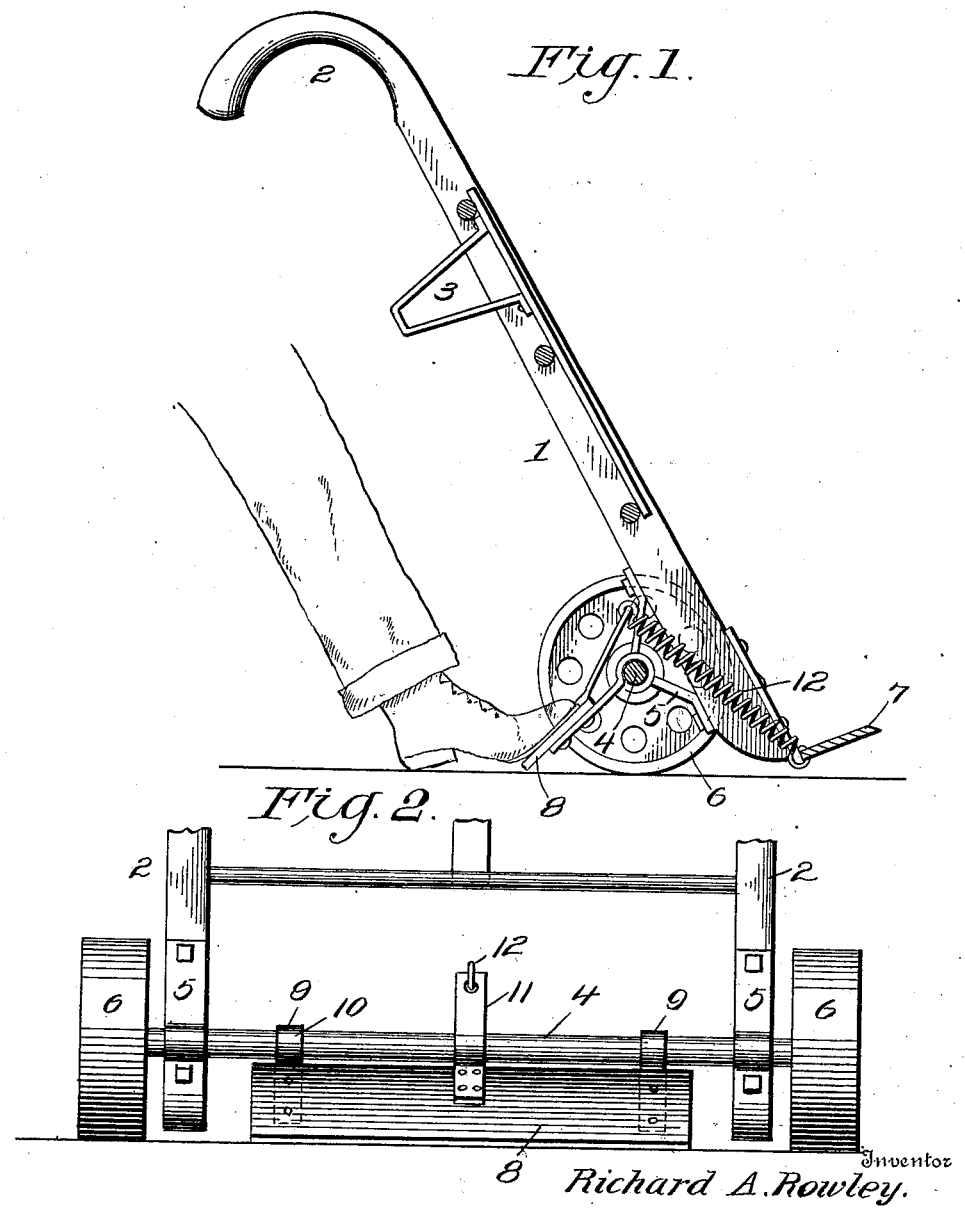

UNITED STATES PATENT OFFICE.

RICHARD A. ROWLEY, OF PEORIA, ILLINOIS.

TRUCK.

No. 925,388.  Specification of Letters Patent.  Patented June 15, 1909.

Application filed February 6, 1909. Serial No. 476,428.

*To all whom it may concern:*

Be it known that I, RICHARD A. ROWLEY, a citizen of the United States, residing at Peoria, in the county of Peoria and State of Illinois, have invented new and useful Improvements in Trucks, of which the following is a specification.

My invention relates to improvements in warehouse trucks for moving bales, barrels, bags, boxes and other heavy commodities and especially with reference to the provision of a chock for holding the truck in place after its nose has been inserted under the load and while disposing the load in place on the truck, as hereinafter described and claimed.

In the accompanying drawings:—Figure 1 is an elevation of a truck provided with an improved chock in accordance with my invention, the truck being shown in elevated position as when its nose is being placed under a box or bale preparatory to loading the same on the truck. Fig. 2 is a detail elevation of the lower portion of the truck from the rear side.

The truck 1 here shown is of the usual construction of warehouse trucks, the handle bars being indicated at 2, the feet at 3, the axle at 4, the bearings at 5, the wheels or rollers at 6 and the nose at 7, the nose when the truck is in elevated position being as is well known intended to be thrust under the box or other article which it is desired to load on the truck. It is the purpose and object of my invention to provide means for chocking the truck to prevent it from backing while being loaded.

In accordance with my invention I provide a chock which is here shown as comprising a rectangular plate 8 of metal of suitable dimensions and provided near its ends with metallic straps or arms 9, the upper ends of which are formed with bearing eyes 10 through which the truck axle 4 extends. The chock plate is also provided at its center on its rear side with an upwardly extending arm 11 to which is connected one end of a coil retractile spring 12, the other end of the said spring being connected to the front end of the truck. This spring serves to normally raise the chock plate so as to cause the same to clear the floor or other surface on which the truck is operated.

In the use of my invention when the truck has been placed in position for the load of a box, bale or other commodity as shown in Fig. 1, the trucker places his foot on the chock plate and presses the same downwardly to cause its lower edge to engage the floor or other surface on which the truck rests and owing to the backward pressure of the load against the front side and lower end of the truck, such chock plate will be kept in engagement with the floor or other surface without further effort on the part of the trucker and he is hence relieved of the labor of holding the truck against the load while the latter is being placed on the truck, as will be readily understood.

What is claimed is:—

A truck of the class described having an axle near its front end, wheels on said axle, a chock plate disposed parallel with the axle, pivotally connected thereto and having a forwardly and upwardly extending arm disposed substantially midway between the ends of said chock plate, said arm extending across and above the axle, and a spring having one end connected to the upper end of said arm and the other end connected to the front of said truck, said spring and said arm coacting to normally raise said chock plate.

In testimony whereof I affix my signature in presence of two witnesses.

RICHARD A. ROWLEY.

Witnesses:
J. H. FORSTON,
T. J. KENNEDY.